United States Patent
Moore (10) Patent No.: US 6,205,369 B1
(45) Date of Patent: *Mar. 20, 2001

(54) NIP PRESSURE SENSING SYSTEM

(75) Inventor: Robert H. Moore, Winchester, VA (US)

(73) Assignee: SW Paper, Inc., Southborough, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/325,938

(22) Filed: Jun. 4, 1999

Related U.S. Application Data (63) Continuation of application No. 08/835,506, filed on Apr. 8, 1997, now Pat. No. 5,953,230, which is a continuation of application No. 08/456,325, filed on Jun. 1, 1995, now abandoned.

(51) Int. Cl.⁷ .............................. G06F 19/00; G06F 7/66
(52) U.S. Cl. ..................... 700/122; 162/252; 162/254; 162/358.3; 162/901; 700/300; 700/301; 242/541.4; 26/78
(58) Field of Search ................................ 700/122, 206, 700/207, 205, 258, 259, 299, 300, 301; 242/541.4, 520; 26/75, 78; 28/268, 269; 162/358.3, 901, 252, 254

(56) References Cited

U.S. PATENT DOCUMENTS

| | | | |
|---|---|---|---|
| 4,016,756 | 4/1977 | Kunkle | 73/141 A |
| 4,233,011 | 11/1980 | Bolender et al. | 425/143 |
| 4,509,237 | 4/1985 | Volz et al. | 29/116 AD |
| 4,520,723 | 6/1985 | Pav et al. | 100/162 B |
| 4,712,472 | 12/1987 | Meisen et al. | 100/37 |
| 4,729,153 | 3/1988 | Pav et al. | 29/116 AD |
| 4,898,012 | 2/1990 | Jones et al. | 72/11 |
| 5,048,353 | 9/1991 | Justus | 73/862.55 |
| 5,379,652 | 1/1995 | Allonen | 73/862.55 |
| 5,383,371 | 1/1995 | Laitinen | 73/862.55 |
| 5,562,027 | * 10/1996 | Moore | 100/35 |
| 5,592,875 | 1/1997 | Moschel | 100/99 |
| 5,699,729 | 12/1997 | Moschel | 100/99 |
| 5,953,230 | * 9/1999 | Moore | 700/122 |

FOREIGN PATENT DOCUMENTS

| | | | |
|---|---|---|---|
| 60-15533 | 1/1985 | (JP) . | |
| 60-15534 | 1/1985 | (JP) . | |
| 361027855 | * 2/1986 | (JP) . | |
| 62-165135 | 7/1987 | (JP) . | |
| 1-157850 | 6/1989 | (JP) | 13/24 |
| 4-221727 | 8/1992 | (JP) . | |
| 6-182977 | 7/1994 | (JP) | 33/14 |

OTHER PUBLICATIONS

Neval, "Compensation For The Effect Of Cylinder Friction In The Pressure Feedback Control Of The Nip Load On A Paper Center Winder", IEEE., pp. 159–163, 1994.*

(List continued on next page.)

Primary Examiner—William A. Cuchlinski, Jr.
Assistant Examiner—McDieunel Marc
(74) Attorney, Agent, or Firm—Myers Bigel Sibley & Sajovec (57) ABSTRACT

A roll sensing system for measuring the pressure distribution and nip width in a nip roll press. The sensing system comprises a strip having sensors thereon, the strip being placed in a nip press, for sensing the pressure at several locations therealong. At one end of the strip lies electronics associated with the sensors. The electronics communicate with an optional multiplexer and a bidirectional transmitter for signal transmission to an external signal conditioner and an external computer. The computer determines pressure values and nip width values at various locations along the strip, and communicates with a display which provides a visual, graphical and/or numerical data to the operator. Optionally, a control system can be in communication with the transmitter or the computer to initiate crown corrections in response to pressure or nip width readings.

18 Claims, 5 Drawing Sheets

OTHER PUBLICATIONS

Measurements of pressure distribution between metal and rubber covered rollers; G. J. Parish; British Journal of Applied Physics; vol. 9, Apr. 1958, pp. 158–161.

A Study of Rubber Covered Press Roll Nip Dynamics; James P. McNamee; The Journal of the Technical Association of the Pulp and Paper Industry; vol. 48, No. 12; Dec. 1965, pp. 673–679.

Experimental Investigation of Rolling Contact; Aris C. Spengos; Journal of Applied Mechanics; Dec. 1965, pp. 859–864.

Embedded Strain Gages for the Measurement of Strains in Rolling Contact; A. Bazergui et al.; Experimental Mechanics, Oct. 1968, pp. 433–441.

Soft calender nip: an interesting subject for research and measurement; J. Koriseva et al.; Paper and Timber, 73(1991):5, pp. 419–423.

Measurement of the Pressure–Time Profile in a Rolling Calender Nip; Samuel F. Keller; $77^{th}$ Annual Meeting of the Canadian Section of the Pulp and Paper Assn., 1991, pp. B89–B96.

Transducers and Techniques of Contact Pressure Measurement; Terry L. Merriman; The Society for Experimental Mechanics, Spring Conference, Jun. 1991, pp. 318–320.

Wesley R. Iversen; "Tactile Sensing, 1990s Style"; Assembly Feb./Mar. 1993, pp. 22–26.

Robert M. Podoloff et al; "Biomedical and Industrial Applications of Grid–Based, Tactile Sensors".

* cited by examiner

NIP PRESSURE SENSING SYSTEM

This is a continuation of application Ser. No. 08/835,506, filed Apr. 8, 1997, now U.S. Pat. No. 5,953,230, which is a File Wrapper Continuation of application Ser. No. 08/456,325, filed Jun. 1, 1995 now abandoned.

FIELD OF THE INVENTION

The present invention relates to a system for use in connection with a press-nip section of a papermaking or related machine such as those used in plastics calendering or steel making, such system being capable of determining pressure as well as nip width distribution between nipped rolls.

BACKGROUND OF THE INVENTION

In the process of papermaking, many stages are required to transform headbox stock into paper. The initial stage is the deposition of the headbox stock onto paper machine clothing or felt. Upon deposition, the white water forming a part of the stock, flows through the interstices of the felt, leaving a mixture of water and fiber thereon. The felt then supports the mixture, leading it through several dewatering stages such that only a fibrous web or matt is left thereon.

One of the stages of dewatering takes place in the nip press section of the papermaking process. In the nip press section, two or more cooperating rolls press the fibrous web as it travels on the felt between the rolls. The rolls, in exerting a great force on the felt, cause the web traveling thereon to become flattened, thereby achieving a damp fibrous matt. The damp matt is then led through several vacuum and dewatering stages.

The amount of pressure applied to the web during the nip press stage is important in achieving uniform sheet characteristics. Variations in nip pressure can affect sheet moisture content and sheet properties. Excessive pressure can cause crushing of fibers as well as holes in the resulting paper product. Conventional methods addressing this problem have been inadequate, and thus, this problem persists in the nip press stage, often resulting in paper of poor quality, having uneven surface characteristics.

Roll deflection, commonly due to sag or nip loading, is a source of uneven pressure distribution. Rolls have been developed which monitor and alter the roll crown to compensate for such deflection. Such rolls usually have a floating shell which surrounds a stationary core. Underneath the floating shell are pressure regulators which detect pressure differentials and provide increased pressure to the floating shell when necessary.

One such roll is described in U.S. Pat. No. 4,509,237. This roll has position sensors to determine the existence of an uneven disposition of the roll shell. The signals from the sensors activate support or pressure elements underneath the roll shell, thereby equalizing any uneven positioning that may exist due to pressure variations. The pressure elements comprise conventional hydrostatic support bearings which are supplied by a pressurized oil infeed line.

A similar roll is disclosed in U.S. Pat. No. 4,729,153. This controlled deflection roll has sensors for regulating roll surface temperature in a narrow band across the roll face. Other controlled deflection rolls such as the one described in U.S. Pat. No. 4,233,010 rely on the thermal expansion properties of the roll material, to achieve proper roll flexure. Such deflection compensated rolls are often useful for varying the crown. Thus, such rolls can operate as effectively at a loading of 100 pounds per inch as at 500 pounds per inch, whereas rolls without such capabilities can only operate correctly at a single specific loading.

Notwithstanding the problem of roll deflection, the problem of uneven loading across the roll length, and in the cross machine direction, persists since pressure is often unevenly applied along the roll. For example, if roll loading in a roll is set to 200 pounds per inch, it may actually be 300 pounds per inch at the edges and 100 pounds per inch at the center.

Methods have been used to uncover discrepancies in applied pressure. One such method requires stopping the roll and placing a long piece of carbon paper, foil, or impressionable film in the nip, which is known as taking a nip impression. However, one must load the rolls carefully to ensure that both sides, that being front and back, are loaded evenly. The pressure in the nip transfers a carbon impression, deforms the foil, or ruptures ink containing capsules in the film, indicating the width of contact. These methods for taking a nip impression are not reusable as they determine only a single event such as the highest pressure or contact width.

One of the major difficulties in using the nip impression procedure, is that of evenly loading the rolls from front to back. The goal of the procedure is to measure and record the final stable loading along the length of the rolls after the initial loading. Often during the initial loading, however, one end will contact before the other end. Thus, there are times when one end is heavily loaded while the other end is only slightly loaded. When this occurs, the nip impression shows the highly loaded condition and not the final state, since the carbon paper, foils, and prescale films record the largest width and/or highest pressures.

Another method of determining the nip pressure profile is to use a prescale film that measures pressure. The film is fed into the nip after the rolls are loaded. Therefore, the film records the stable loaded condition, rather than the worst consequence of the loading process. Such a process eliminates the loading difficulties associated with nip impressions. Nonetheless, the prescale films must be interpreted using a densitometer. This process is cumbersome, time consuming, and generally inefficient. Furthermore, the prescale films are not reusable. A new piece of film must be fed into the nip after any corrective adjustments are made. Lastly, the prescale films are temperature and moisture dependant, thus leading to inaccurate and unreliable results.

SUMMARY OF THE INVENTION

It is an object of the invention to measure pressure distribution along the length of a roll in a nip press.

It is another object of the invention to measure pressure distribution in the cross machine direction in a nip press.

It is yet another object of the invention to measure nip widths.

It is still another object of the invention to reuse the sensing system at multiple nip press locations to measure pressure distribution and nip widths on different length rolls.

It is yet another object of the invention to adjust the crown in response to irregular pressure distributions.

It is yet another object of the invention to adjust the crown in response to irregular nip widths.

It is yet another object of the invention to adjust the journal forces or applied loads in response to irregular pressure distributions.

It is yet another object of the invention to adjust the journal forces or applied loads in response to irregular nip width distributions.

It is still another object of the invention to provide a method of determining the pressure in a nip press.

It is still another object of the invention to provide a method of determining the nip width in a nip press.

These and other objects of the invention are achieved by a roll sensing system for measuring the pressure distribution and nip width in a nip. The sensing system comprises a strip having sensors thereon, the strip being placed between rolls in a nip press, for sensing the pressure and/or nip width at several locations along the roll. Electronics associated with the sensors communicate with an optional multiplexer and a bidirectional transmitter for signal transmission to an external signal conditioner and an external computer. The computer determines pressure values and nip width values at various locations along the strip, and communicates such values to a display which provides graphical and/or numerical data, visually to the operator. Optionally, a control system can be in communication with the transmitter, or the computer to initiate crown corrections in response to pressure or nip width readings.

BRIEF DESCRIPTION OF THE DRAWING

A preferred embodiment of the invention is described below with reference to the following figures wherein like numerals represent like parts.

DETAILED DESCRIPTION OF THE INVENTION

Figure 1:
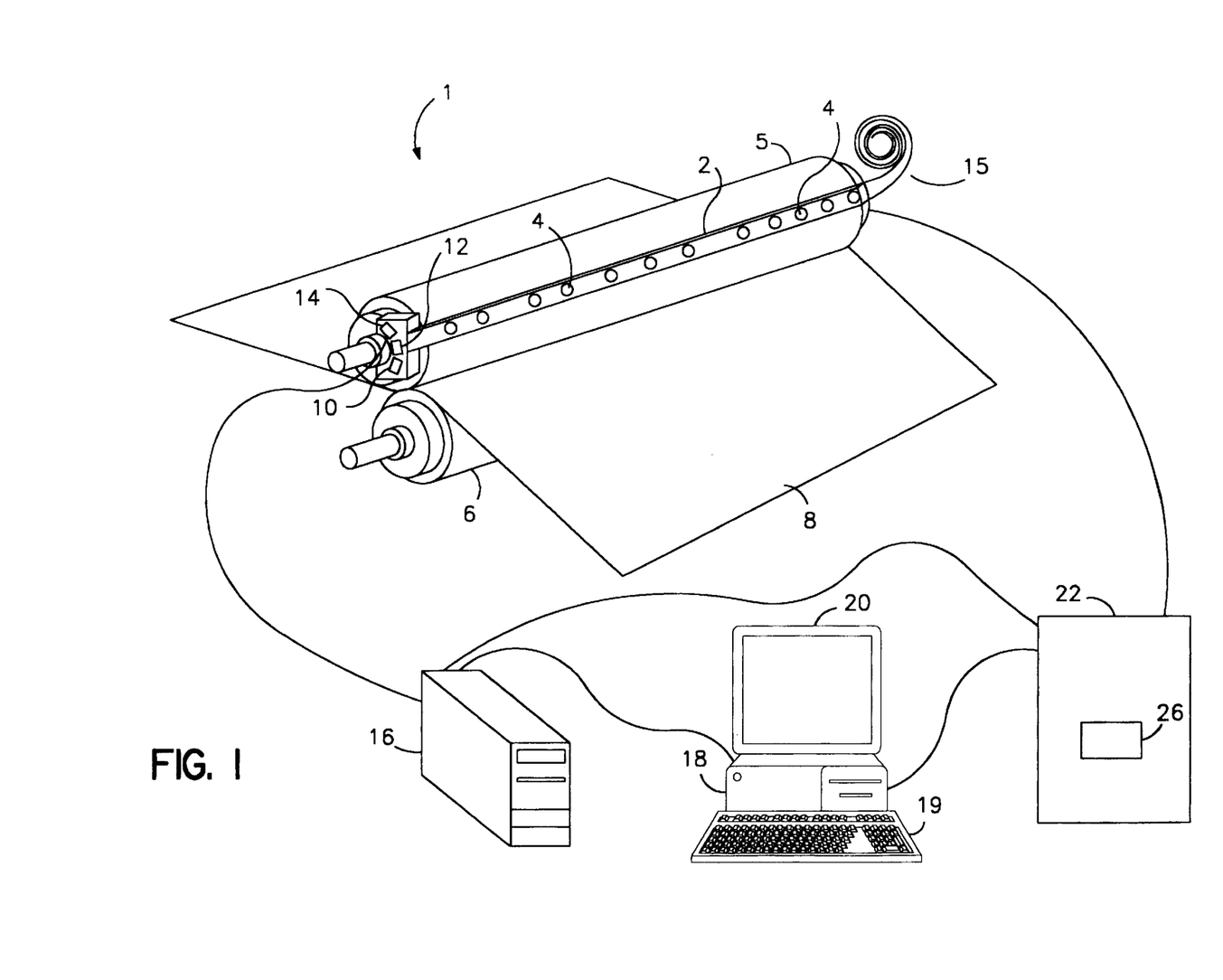
FIG. 1: shows one embodiment of the sensing system of the instant invention as it is applied on a roll in a press.

FIG. 1 shows a preferred embodiment of the sensing system 1 of the instant invention as it is applied to sense the pressure exerted by rolls 5, 6 in a nip press. In the nip press section of a papermaking machine, rolls 5 and 6 rotatingly squeeze a fibrous web which is carried on the felt 8 disposed therebetween. In order for the rolls 5, 6 to provide uniform pressure to a fibrous web, they must be evenly loaded and the width of contact between the rolls, i.e. the nip width, should be within a predetermined range.

The sensing system 1 comprises a strip 2, preferably an elongated member made of a thin film of material. Sensors 4 are fixed to the strip for sensing pressure/force and/or nip width.

The strip 2 having sensors 4 thereon is shown for discussion purposes as not contacting the felt 8 and roll 6. During system operation, however, the strip 2 must lie in the nip, between roll 5 and the felt 8 or directly between rolls 5 and 6. Placement of the strip 2 within the nip may be achieved by removably attaching the strip to roll 5, as shown, and then rotating roll 5 to properly position the strip. Alternatively, the strip may be may be placed directly between rolls 5 and 6 and rolled into the nip by rotating the rolls. One could also, open the nip formed by rolls 5, 6, place the strip between the rolls, and then close the nip.

The strip 2 having sensors 4 thereon, is preferably rolled into a coil 15 for storage and unrolled during use. The sensors 4 are spaced on the strip so that if a large number of sensors is required to effectively determine pressure distribution or nip width, such as in the case of a long roll, the operator can continue to utilize the strip. Thus, the sensing system can be used on any length roll, eliminating the need for different length sensing systems for different rolls and/or mills. Also, several strips of sensors may be pieced end-to-end to span the length of very long rolls.

Although many types of sensors known to those skilled in the art would serve the desired function, the sensors 4 preferably comprise resistive, piezoelectric, piezoresistive, strain gage or fiber optic materials. Also, the sensors could be equipped with temperature measuring sensors to aid in temperature compensation if needed.

Figure 2:
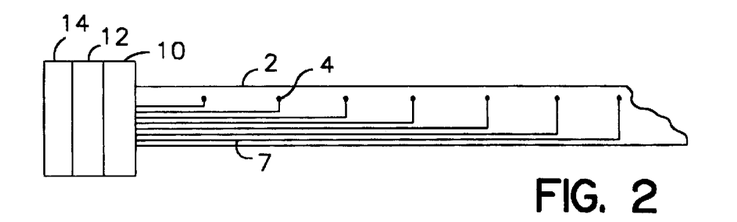
FIG 2: shows a top view of a sensing strip used in the system according to the instant invention.

In communication with the sensors 4 are lead wires 7, as shown in FIG. 2, and associated electronics 10. The electronics 10 connected to the sensors 4 via lead 7, aid in converting the sensor signal to a pressure signal, by amplifying the signal or eliminating external interference. The type of sensor used, however, determines the nature of the associated electronics 10. For example, if piezoelectric or piezoresistive sensors are used, the electronics 10 will comprise charge amplifiers. Alternatively, if strain gage sensors are used, the electronics 10 will comprise wheatstone bridges. If fiber optic materials are used, the electronics will comprise an optical phase modulator.

The electronics 10 are in communication with a multiplexer 12 which is accessed by a bidirectional transmitter 14. The multiplexer 12 cycles through the sensors 4 to obtain pressure signals from sensor locations along the strip 2, and thus along the roll 5, in the nip press. The bidirectional transmitter 14, transmits the signals from the multiplexer 12 to a signal conditioner 16 which in turn, delivers conditioned signals representing the pressure sensed, to the computer 18.

The sensors and associated electronics are preferably connected directly to the computer via wire cable. Nonetheless, the signals may be sent via telemetry or through slip rings. A preferred telemetry transmitter is manufactured by MICROSTRAIN of Burlington, Vt. This telemetry transmitter has a single channel FM bridge transmitter that can be switched on and off remotely, to conserve power. An alternative transmitter is manufactured by PHYSICAL MEASUREMENT DEVICES of Melbourne, Fla. Model PAM-15 incorporates 15 channels over one radio link.

The computer 18 has a microprocessor having the ability to access the multiplexer 12 at predetermined or requested times to obtain pressure-related or width-related data. Requested transmissions are achieved by operator input through the keyboard 19 of the computer. Once the computer 18 has indicated to the multiplexer 12 which channels to read, the computer 18 receives the signals from the sensors 4 associated with the channels or leads 7, selectively accessed by the multiplexer.

Such signals are delivered to the microprocessor which runs a software program to compute a pressure value or nip width value. Preferably, these values are then transmitted to a display 20 which provides numerical or graphical cross machine pressure profiles and/or nip width profiles.

The computer 18 can further provide averages of the pressure or nip width values, as well as initiate a correction signal to an optional control system 22. In addition, the computer 18 can determine nip widths indirectly from the pressure sensed, through analysis software such as "NipCalc", produced by STOWE WOODWARD of Southborough, Mass. The software takes the pressure signals and provides output data relating to nip width, which is useful in making crown corrections. This can also be accomplished through empirical relationships such as the ones used to relate nip width to line load, or through experimentally obtained graphs. Alternatively, nip widths can be sensed directly through the use of pressure sensitive material, to be discussed further with respect to FIGS. 3–4.

The control system 22 can be connected to the computer 18 or the signal conditioner 16 to correct any sensed pressure irregularities, by increasing or decreasing the force being applied by the roll, or by increasing or decreasing the degree of contact between the rolls 5, 6. The control system 22 has an internal computer 26 for receiving user inputs in response to interpretation of pressure sensed, or for receiving direct pressure readings from the signal conditioner. The control system's computer 26, upon receipt of such signals initiates corrective measures to adjust the force being applied by the roll 2.

Turning now to FIG. 2, the strip 2 preferably has sensors 4 disposed thereon at spaced locations. The spacing of the sensors is in accordance with the usual practice for crown correction measurements. Although the sensors 4 are shown uniformly and linearly across the roll 2, this configuration is not essential, as the placement of the sensors on the roll can appear in other configurations as well. Leads 7 emanate from each of the sensors, and travel to the associated electronics 10, to provide signals representative of the pressure sensed to the multiplexer 12. As discussed above, these signals are ultimately passed through the bidirectional transmitter 14 where they can be selectively accessed by the computer 18 through the signal conditioner 16.

Figure 3:
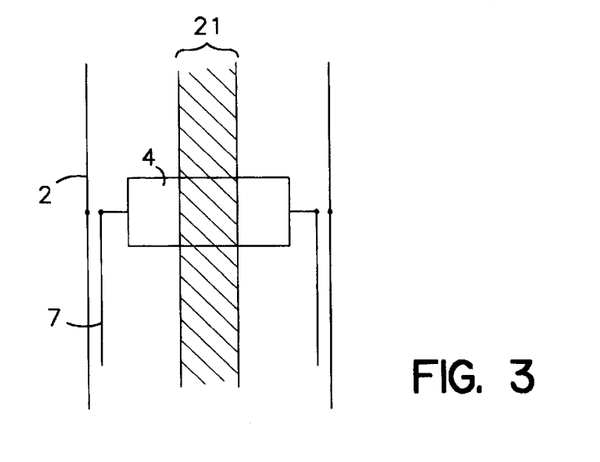
FIG. 3: shows a top view of an alternative configuration for the nip width sensors according to the instant invention.
Figure 4A:
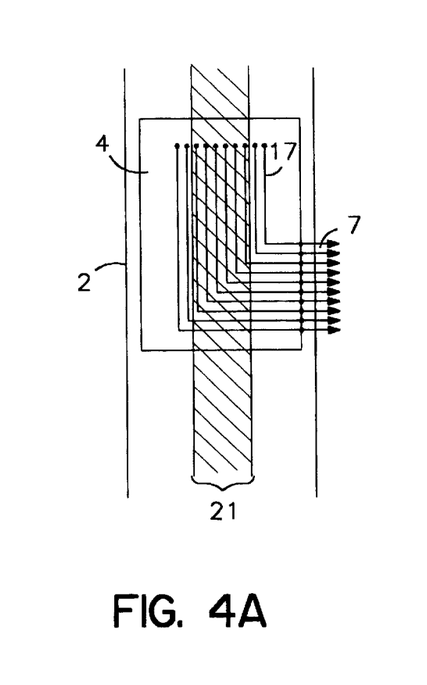
FIG 4A: shows a top view of another alternative configuration according to the instant invention wherein pressure sensitive lines on the sensors are used to determine nip width.
Figure 4B:
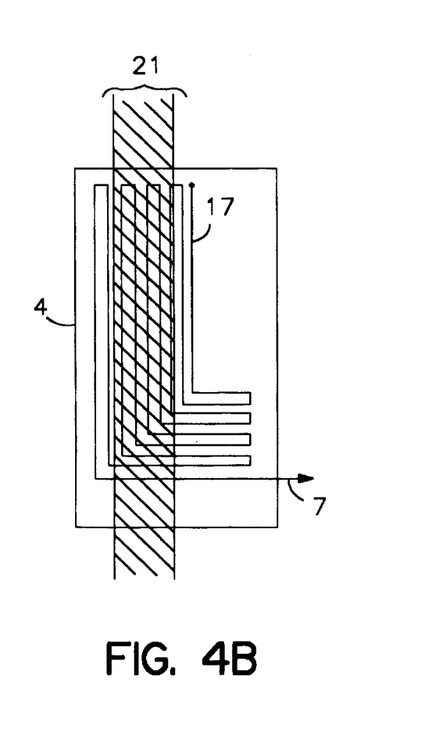
FIG. 4B: shows a top view of a variation of the configuration of FIG. 4A wherein the pressure sensitive lines of the sensor are connect in series.
Figure 4C:
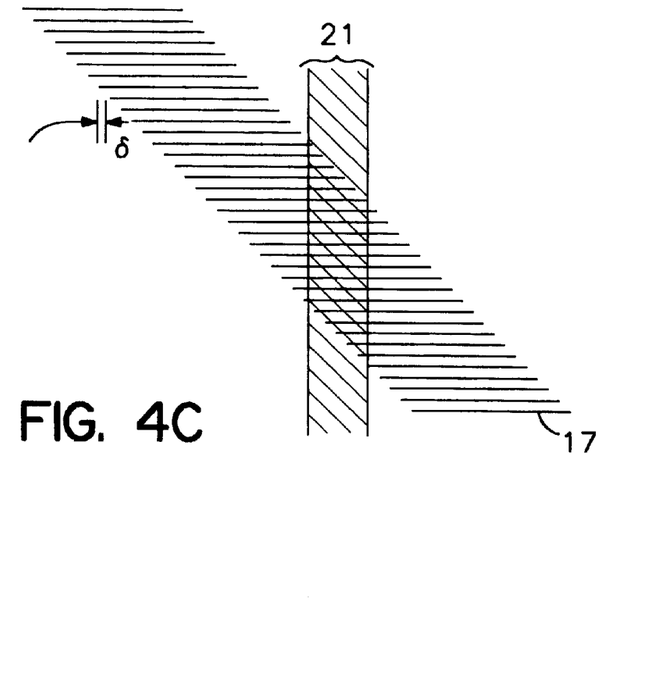
FIG. 4C: shows a top view of still another configuration according wherein the sensor is inserted into the nip with the pressure sensitive lines arranged at an angle with respect to the roll length.
Figure 4D:
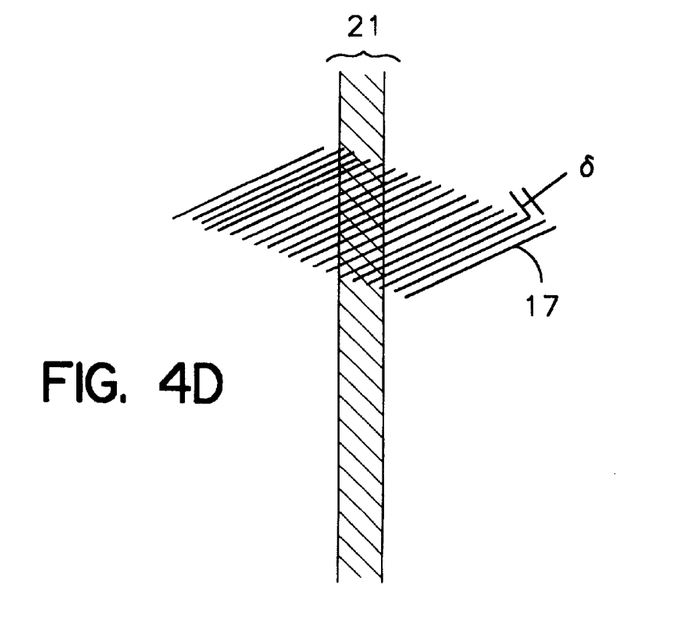
FIG. 4D: shows a top view of a variation of the configuration of FIG. 4C.

Alternative configurations for the sensors 4 on the sensing strip 2 are illustrated in FIGS. 3–4D. These configurations are desirable for the direct determination of nip widths. FIG. 3 shows an alternative nip width sensor approach wherein the each sensor along the strip 2 is wider than the largest expected nip width 21. The sensor signal changes in response to the area under pressure. Thus, the nip width 21 is related to the sensor response and the length of the sensor.

FIGS. 4A–4D illustrate alternative configurations wherein nip width is determined based on a change in the signal(s) from the pressure sensitive lines 17 in the sensors. Each pressure sensitive line 17 in the sensor is connected to a lead line 7 through which a signal representative of the pressure applied to the line may be monitored. For the nip width sensor shown in FIG. 4A, the nip width 21 may be measured by counting the number of lines 17 in each sensor that provide a signal indicating that they are under pressure. If the lines are equally spaced, then the nip width is calculated by the line spacing multiplied by one less than the number of lines under pressure:

$$\text{NIP WIDTH} = \delta[N-1]$$

where $\delta$ = the spacing between the lines,

N = number of lines contacted by the rolls.

The nip width sensitivity of this configuration is related to the space between lines. For example, as the amount of space between the lines 17 is decreased the accuracy of the nip width measurement improves.

An alternative to this embodiment is shown in FIG. 4B, wherein the pressure sensitive lines of the sensor 4 are joined in a series configuration. Here, the nip width 21 at the sensor 4 is related to the signal measured at lead line 7 which is represents the pressure sensed along the entirety of the series connected pressure sensitive line 17.

Yet another alternative sensor configuration is illustrated in FIG. 4C. Here, as in the configuration of FIG. 4A, the nip width 21 is measured by counting the numbers of lines under pressure, but the nip width sensitivity is dependant upon the offset spacing between the pressure sensitive lines. Thus, the nip width is estimated as:

$$\text{NIP WIDTH} = \delta[(N) - w/\delta]$$

where $\delta$ = the offset spacing between pressure sensitive lines,

N = number of lines contacted by rolls, w = width of strip.

Another variation is shown in FIG. 4D. Here, the lines may also be at an angle with respect to the roll length. Nip width sensitivity in this case depends upon the offset spacing as well as the angle at which the lines intersect the roll axis.

Figure 5A:
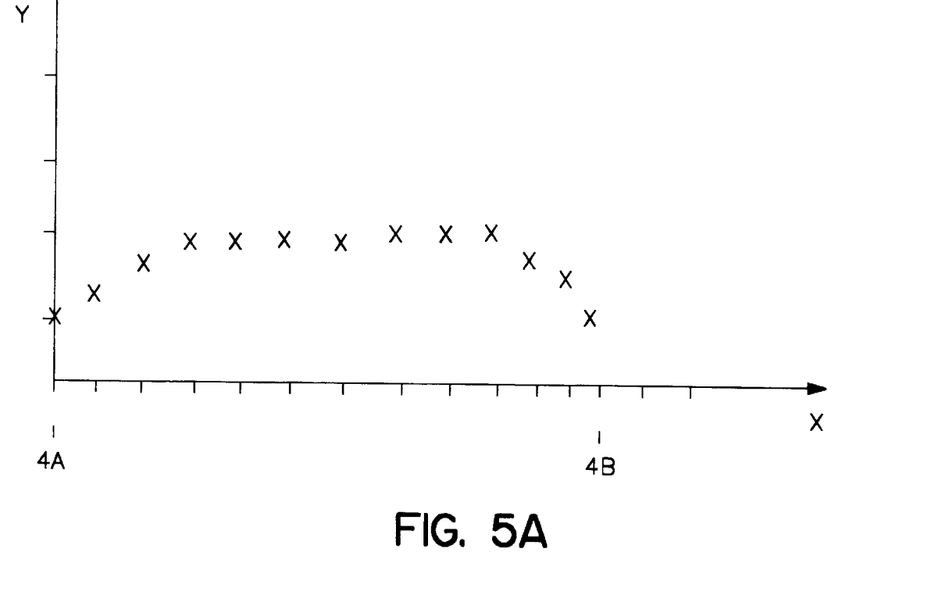
FIG. 5A: shows a graphical display of the pressure measured at locations along the sensing strip in a nip press.
Figure 5B:
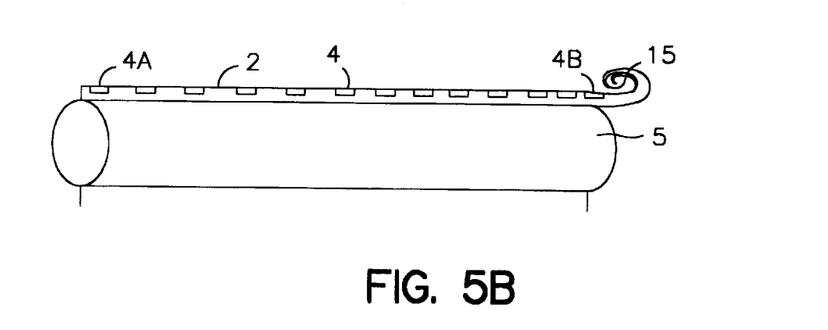
FIG. 5B: shows the sensing strip on a roll in the nip press, corresponding to the graphical display of FIG. 5A.

Turning now to FIG. 5A, a graphical representation is shown of the pressure sensed along the length of the roll depicted in FIG. 5B in terms of sensor location on the strip, set forth on the x-axis, versus pressure sensed, set forth on the y-axis. Referring to FIG. 5B, the pressure sensed by the sensor 4A at the front of the strip 2 represents the pressure sensed at the front of the roll 5. Similarly, the pressure sensed by the sensor 4B on the strip represents the pressure at the end of the roll 5. The sensor 4B may, however, not be the last sensor on the strip 2 due to the possibility of having an unused, coiled portion of the strip.

Figure 6A:
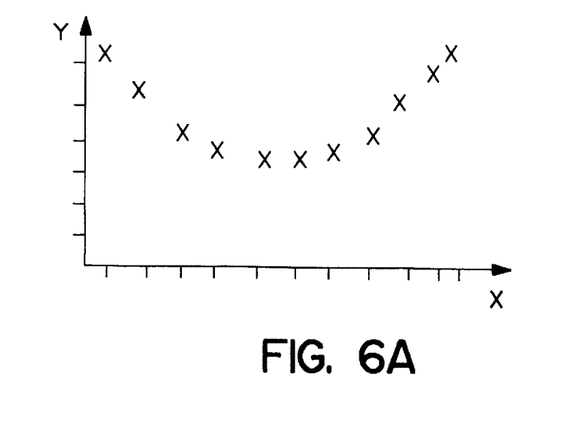
FIG. 6A: shows a graphical display of the nip width distribution measured in a nip press.
Figure 6B:
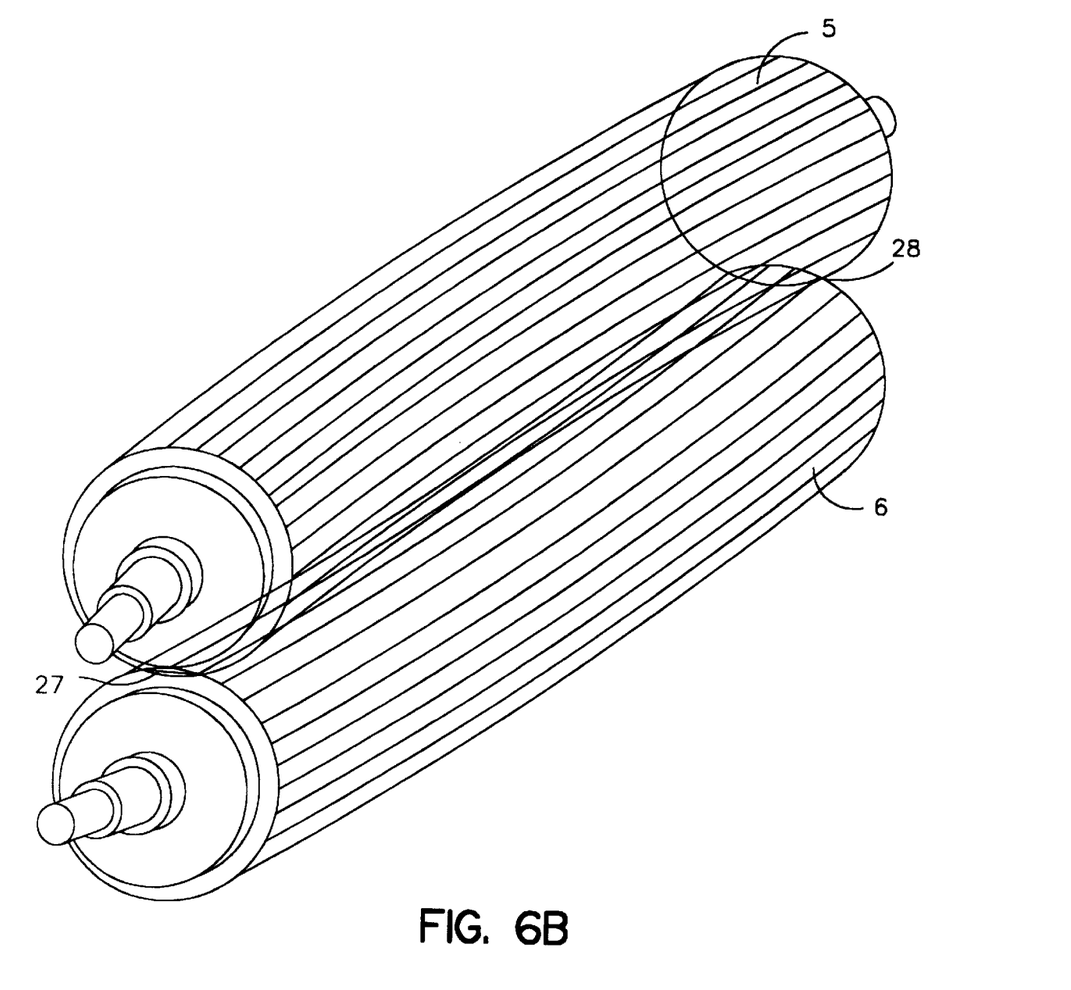
FIG. 6B: shows the sensing strip in a nip press corresponding to the graphical display of FIG. 6A.

FIG. 6A provides a graphical representation of the nip width distribution for the rolls 5, 6 of FIG. 6B. This representation may be achieved using any of the strip configurations illustrated in FIGS. 3–4D. As can be seen, the ends 27, 28 of the rolls are loaded move heavily than the center and the corresponding nip widths are greater on the ends. This loading distribution is commonly called "undercrowned", indicating that the crown is too small for the journal loading. A uniform nip width distribution/pressure profile may be achieved by increasing the crown or by decreasing the journal loads.

The general operation of the invention is as follows. One may approach the test in many ways. One way would be to unload the rolls in contact. The sensor strip 2 is placed between the two rolls, leaving the unused portion in a coiled configuration at the end of the roll 5. Roll 6 is then loaded against roll 5, which has the strip 2 thereon. After the rolls are loaded to the prescribed journal forces, usually measured by air bag pressures, the sensor strip 2 readings are acquired, as discussed above.

Another approach to test the nip pressure profile would be to load the rolls at the prescribed journal forces, and then feed the sensor strip 2 through the nip. The placement of the strip 2 may be achieved through a robotic arm or other automated equipment currently available. In addition, the strip 2 could be attached lengthwise to one of the rolls, or could be carried by the felt or web. The sensor readings would be acquired as the sensor passes through the nip.

At a predetermined, or at an operator-requested time, the computer 10 communicates with the bidirectional transmitter 14, which further communicates with the multiplexer 12. The multiplexer 12 then cycles through the sensors 4, obtaining signals through the associated electronics 10, which signals are indicative of the pressure being sensed by the sensors 4. The multiplexer 12 then communicates with the transmitter 14 to send the signals to the signal conditioner 16 for delivery back to the computer 10 where the determination of the pressure values takes place.

In the same manner, the operator can retrieve signals relating to the nip width sensed. The computer 18 then causes a numeric or graphical output to appear on the display 20, alerting the operator of the pressure distribution or nip width in the static nip press. Optionally, the computer 18 and/or transmitter 14 can communicate pressure-related or width-related signals to the control system 22. In response to such signals, the control system 22 can then initiate crown correction to remedy any irregularities in the pressure sensed.

The system of the instant invention provides the operator with the ability to determine the pressure profile of a roll in one or more nips so as to diagnose the presence of unevenly applied roll forces. The various graphical representations enable the operator to immediately determine the pressure being applied, the location on the strip, thus indicative of the location along the length of the rolls, and whether or not it is abnormal. Additionally, the system of the instant invention provides for corrective measures to be initiated in response to such unevenly applied forces.

While the invention has been particularly shown and described with reference to the aforementioned embodiments, it will be understood by those skilled in the art that various changes in form and detail may be made therein without departing from the spirit and scope of the invention. Thus, any modification of the shape, configuration and composition of the elements comprising the invention is within the scope of the present invention. It is to be further understood that the instant invention is by no means limited to the particular constructions or procedures herein disclosed and/or shown in the drawings, but also comprises any modifications or equivalents within the scope of the claims.

What is claimed is:

1. A system for determining characteristics of two rolls configured in a nip press comprising:
    a strip adapted to be placed in said nip press, said strip having a plurality of sensors for providing signals representative of the nip width between said two nip rolls, said sensors being configured to respond to pressure exerted thereon and to provide signals based on the area of said sensor under pressure, wherein said sensors are fiber optic sensors.

2. The system for determining characteristics of a nip press according to claim 1, said system further comprising a computer for accessing said signals and calculating values representative of said signals.

3. The system for determining characteristics of a nip press according to claim 2, said system further comprising a display, coupled to said computer, for providing a visual representation of said values.

4. The system for determining characteristics of a nip press according to claim 2, wherein said computer is adapted to perform measurements of nip width from said signals.

5. The system for determining characteristics of a nip press according to claim 2, wherein said computer is adapted to automatically request measurements of nip width at predetermined times.

6. The system for determining characteristics of a nip press according to claim 2, said system further comprising a wireless transmitter for communicating said signals to said computer.

7. The system for determining characteristics of a nip press according to claim 1, said system further comprising a control system in communication with said sensors for initiating corrective measures to said nip press.

8. The system for determining characteristics of a nip press according to claim 1, wherein said sensors are configured on said strip to span the largest expected nip width between said two rolls thereby allowing calculation of the nip width of said nip press from said signals.

9. A method for determining characteristics of a first roll configured with a second roll in a nip press comprising:
    placing a strip in said nip press, said strip having a plurality of sensors thereon for providing signals representative of nip width between said first and second rolls, said sensors being configured to respond to pressure exerted thereon and to provide signals based on the area of said sensor under pressure, wherein said sensors are fiber optic sensors; and
    using a computer in communication with said sensors to compute measurements from said signals.

10. A method for determining characteristics of a nip press according to claim 9, said method further comprising displaying said measurements on a display coupled to said computer.

11. A method for determining characteristics of a nip press according to claim 10, said method further comprising displaying locations along the strip where the nip width is being sensed.

12. A method for determining characteristics of a nip press according to claim 10, said method further comprising displaying the nip width of said nip press.

13. A method for determining characteristics of a nip press according to claim 9, wherein said strip is placed against said first roll and said second roll is loaded against said first roll.

14. A method for determining characteristics of a nip press according to claim 9, wherein said strip is fed through said nip press.

15. A method for determining characteristics of a nip press according to claim 9, wherein said strip is carried through the nip press on a felt between the first and second rolls.

16. A system for determining characteristics of two rolls configured in a nip press comprising:
    a strip adapted to be placed in said nip press;
    at least one sensor mounted on said strip for providing signals representative of the nip width between said two nip rolls, said sensor being configured to respond to pressure exerted thereon and to provide signals based on the area of said sensor under pressure, wherein said sensor is a fiber optic sensor.

17. The system for determining characteristics of a nip press of claim 16 wherein said sensor has an effective sensing length greater than the expected nip width whereby said sensor may be stationarily positioned such that said effective sensing length extends entirely across the nip width and being configured such that, when said sensor is stationarily positioned between the two nip rolls with at least a portion of said sensor positioned within the nip width, said sensor is operative to respond to pressure exerted thereon by the two nip rolls by providing a signal proportional to the area of said sensor under pressure.

18. A method for determining characteristics of a first roll configured with a second roll in a nip press including measuring nip widths between the rolls while the rolls are in a static condition, said method comprising the steps of:

providing a strip having a fiber optic sensor for providing signals representative of nip width between said first and second rolls, the sensor having an effective sensing length greater than the expected nip width and being configured such that, when the sensor is stationarily positioned between the two nip rolls with at least a portion of the sensor positioned within the nip width, the sensor is operative to respond to pressure exerted thereon by the two nip rolls by providing a signal proportional to the area of the sensor under pressure;

placing and maintaining the strip between the two nip rolls with at least a portion of the sensor positioned within the nip width and such that the effective sensing length extends entirely across the nip width;

while the sensor is stationarily positioned with respect to the nip width and the effective sensing length extends entirely across the nip width, generating signals with the sensor which are proportional to the area of the sensor under pressure; and computing measurements from said signals with a computer in communication with said sensor.

* * * * *